(12) United States Patent
Anugu et al.

(10) Patent No.: US 9,026,839 B2
(45) Date of Patent: May 5, 2015

(54) CLIENT BASED HIGH AVAILABILITY METHOD FOR MESSAGE DELIVERY

(71) Applicant: Cellco Partnership, Basking Ridge, NJ (US)

(72) Inventors: Sabitha Anugu, Monroe Township, NJ (US); Shankar A. Kulkarni, Bridgewater, NJ (US); Henry H. Li, Madison, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/163,637

(22) Filed: Jan. 24, 2014

(65) Prior Publication Data

US 2014/0143592 A1    May 22, 2014

Related U.S. Application Data

(63) Continuation of application No. 13/187,121, filed on Jul. 20, 2011, now Pat. No. 8,639,965.

(51) Int. Cl.
*G06F 11/07* (2006.01)
*H04L 29/08* (2006.01)
*H04L 29/14* (2006.01)

(52) U.S. Cl.
CPC ............ *G06F 11/0742* (2013.01); *H04L 67/02* (2013.01); *H04L 69/40* (2013.01)

(58) Field of Classification Search
CPC ............ G06F 11/0742; G06F 11/2033; G06F 11/2041; G06F 11/1402; G06F 11/2035; G06F 2209/548; H04L 41/06; H04L 41/0654; H04L 45/586

See application file for complete search history.

(56) References Cited

U.S. PATENT DOCUMENTS

| | | | |
|---|---|---|---|
| 6,665,814 B2 | 12/2003 | Hobson et al. | |
| 6,920,476 B2 | 7/2005 | McGann et al. | |
| 7,111,063 B1 | 9/2006 | Clark et al. | |
| 7,624,308 B2 * | 11/2009 | Critchley et al. | 714/47.1 |
| 7,793,140 B2 * | 9/2010 | Chen et al. | 714/4.11 |
| 8,156,374 B1 * | 4/2012 | Ford et al. | 714/15 |
| 8,484,659 B2 * | 7/2013 | Davies et al. | 719/314 |
| 8,693,981 B1 * | 4/2014 | Anugu | 455/405 |
| 2003/0182464 A1 | 9/2003 | Hamilton et al. | |
| 2005/0232291 A1 * | 10/2005 | Brown et al. | 370/428 |
| 2006/0200705 A1 | 9/2006 | Burger et al. | |
| 2007/0005800 A1 * | 1/2007 | Banks et al. | 709/238 |

OTHER PUBLICATIONS

Entire prosecution history of U.S. Appl. No. 13/187,121, filed Jul. 20, 2011, entitled "Client Based High Availability Method for Message Delivery."

* cited by examiner

*Primary Examiner* — Nadeem Iqbal

(57) ABSTRACT

A message queue (MQ) failover handler receives a message and a configuration file from a client application. The configuration file provides an indication of which of a number of queue managers (QMs) is the first choice for receipt and delivery of the message to a server application. The configuration file also provides an indication of which of the QMs is the second choice for receipt and delivery of the message to the server application, should the first choice of the QMs be unavailable.

20 Claims, 8 Drawing Sheets

CLIENT BASED HIGH AVAILABILITY METHOD FOR MESSAGE DELIVERY

RELATED APPLICATIONS

This application is a continuation of and claims the benefit of U.S. application Ser. No. 13/187,121, filed Jul. 20, 2011 entitled "CLIENT BASED HIGH AVAILABILITY METHOD FOR MESSAGE DELIVERY" now U.S. Pat. No. 8,639,965, the disclosure of which also is entirely incorporated herein by reference.

BACKGROUND

As demand for automation increases, enterprise applications that are highly available are better positioned to fulfill business requirements and keep up with market competition. In addition to mission critical requirements such as scalability, high availability, distributed, time sensitivity, performance, modularity, loose coupling, and many more, enterprise applications that communicate with other internal or external enterprise systems are better equipped to fulfill business requirements. With an ever increasing dependency on IT infrastructure to perform critical business processes, the availability of the IT infrastructure is becoming more important. Failure of an IT infrastructure may result in large financial losses, which increase with the length of the outage. Thus, careful planning may be required to ensure that the IT system is resilient to any hardware, software, local or system-wide failure. An application environment may be considered highly available if it possesses the ability to recover automatically within a prescribed minimal outage window. Therefore, an IT infrastructure that recovers from a software or hardware failure, and continues to process existing and new requests, may be considered highly available.

Factors that can cause a system outage and reduce availability fall into two categories: planned and unplanned. Planned disruptions may be related to systems management (e.g., upgrading software or applying patches), or to data management (e.g., backup, retrieval, or reorganization of data). Conversely, unplanned disruptions may be related to system failures (e.g., hardware or software failures) or to data failures (e.g., data loss or corruption).

Enterprise Application Integration (EAI) is an integration framework composed of a collection of technologies and services which form a middleware to enable integration of systems and applications across the enterprise. EAI tools such as Message Oriented Middleware (MOM) software include features to fulfill enterprise application requirements. In some IT infrastructures, MOM technologies such as WebSphere MQ and/or other software and hardware make applications highly available. In some instances, Websphere MQ is clustered to achieve high availability.

WebSphere MQ is a MOM product, available from IBM, which functions to transfer a datagram from one application to another on one computer system, or from one application to an application running on another computer system. When persistent messaging is used, WebSphere MQ logs messages to disk storage. Therefore, in the event of a failure, the combination of the message data on the disk plus the queue manager logs can be used to reconstruct message queues (MQs), restoring the queue manager to a consistent state at the time just before the failure occurred. MQs include message queues and mailboxes that are software engineering components used for intercrosses communication, or for inter-thread communication within the same process. Such MQs are used for messaging—the passing of control of content, and group communication systems may provide similar kinds of functionality.

In this context, a recovery involves completing normal unit of work, with in-flight messages being rolled back, in-commit messages being complete, and in-doubt messages waiting for coordinator resolution. Various solutions use WebSphere MQ to improve availability: an active-passive solution using a shared disk; an active-active solution using WebSphere MQ queue manager clusters; and an active-active solution using WebSphere MQ queue manager clusters and a shared disk.

In the active-passive solution, when a queue manager fails, a restart is required to make the local message queues available again. Until then, the messages stored on the queue manager will be stranded. In this solution, a second node is used as a passive node without its resources being used. The passive node becomes active when a failover is induced. In this process, the queue manager data files and logs are stored on an external shared disk that is accessible to one of the two nodes at any given time. The external disk used in this solution needs to be fail proof to prevent the external disk from being a single point of failure. In a normal operation, the shared disk is mounted on the active node, which uses the storage to run the queue manager in the same way as if the shared disk were a local disk, storing both the queues and the WebSphere MQ log files on the shared disk. When a failure is detected on the active node, the failover process is induced automatically and then the passive node takes over the role of the active node, mounts the shared disk and starts the queue manager. The passive node reads the logs and queue manager's state from the shared disk to return to the correct state and resume normal operations. This failover operation can also be performed without the intervention of a server administrator, requiring external clustering software to detect the failure and initiate the failover process.

Clustering software is sometimes used in conjunction with the active-passive solution. High availability clustering software addresses high availability issues using a more holistic approach than individual applications. This clustering software groups applications and other hardware and software resources into groups called resource groups. High availability clusters (also known as failover clusters) are implemented primarily for the purpose of improving the availability of services that the cluster provides. High availability clusters operate by having redundant nodes, which are then used to provide service when system components fail. The most common size for a high availability cluster is two nodes, which is the minimum requirement to provide redundancy. High availability cluster implementations attempt to use redundancy of cluster components to eliminate single points of failure. When failure occurs in one of the applications in the group, the entire group is moved to a standby node. Several vendors provide clustering. Some solutions, such as Veritas Cluster Server and SteelEye LifeKeeper, are also compatible with multiple platforms to provide a similar solution in heterogeneous environments.

While the active-passive solution may be useful for messages that are delivered once and only once, and clustering software may make an existing application and its dependent resources such as database message queue highly available, there are a number of drawbacks associated with the active-passive solution. For example, the solution requires additional hardware (e.g., shared disks) and external clustering software (e.g., VERITAS), which increase administration costs associated with administration of the components. Additionally, the resources on the idle passive node will not be utilized. Further, the queue manager is not available while the failure is being detected and until the services are restored on the passive node. Moreover, the client (i.e., application or system that accesses a remote service on another computer system) must handle the outage during the failover which might take from a few seconds to minutes. Finally, the application will not be available until the failover process is complete.

An alternative to the active-passive solution is the active-active solution using WebSphere MQ queue manager clusters. A WebSphere MQ queue manager cluster is a cross platform workload balancing solution that allows WebSphere MQ messages to be routed around a failed queue manager. The WebSphere MQ queue manager allows a queue to be hosted across multiple queue managers, thus allowing an application to be duplicated across multiple machines. The WebSpehere MQ queue manager provides a highly available messaging service allowing incoming messages to be forwarded to any queue manager in the cluster for application processing. Therefore, if any queue manager in the cluster fails, new incoming messages continue to be processed by the remaining queue managers. While WebSphere MQ clustering provides continuous messaging for new messages, it is not a complete solution because it is unable to handle messages that have already been delivered to a queue manager for processing. Thus, when the local queue manager fails, the local client will not be able to send any messages until the queue manager is brought up. The active-active solution using WebSphere MQ queue manager clusters may be useful for workload balancing across distributed systems, may allow for alternative queue managers to handle the load transparently when a queue manager goes down, and may be able to scale applications linearly through the use of new queue managers added to the cluster to aid in the processing of incoming messages. However, there are a number of drawbacks associated with this solution. For example, there is no way to process the messages that have already been delivered to a queue manager that just failed. Additionally, the application will be required to handle the outage until the local queue manager is restarted, failing to send and consume messages.

A combination of the active-passive solution and the active-active solution using WebSphere MQ queue manager clusters may provide a better solution which deals with time sensitive messaging. Thus, WebSphere MQ clustering with the recovery techniques such as shared disks with clustering software may be used. Such a solution may be implemented by combining external clustering technology with WebSphere MQ queue manager clusters, providing combined benefits for achieving high availability. WebSphere MQ clustering with high availability software enabled shared disks may eliminate issues associated with stranded messages by processing such messages via other active nodes. However, the queue manager in such a solution is not available during the failure detection and until the services are restored on the passive node. Additionally, the client must handle the outage during the failover, which might take from a few seconds to minutes. Further, the application is not available until the failover process is complete. Finally, such a solution is not an ideal and cost-effective solution for every enterprise application, as it incurs extra costs for additional hardware and software.

While several vendors are available in the market to provide software or hardware to address high availability related issues, in many scenarios, vendor software requires complex installation and configuration steps. Further, during the failover, the client application must handle the broken connection and wait until the failover is complete. In a mission critical application like visual voice mail, such delay may not be acceptable.

Applications using existing solutions are prone to failure for a number of reasons: configuration and tuning the software is complex and requires a highly specialized administrator; due to the complexity in cluster and software configuration, incorrect configuration can cause many production outages and service interruptions; setting up shared disks and software incurs extra administrative costs and this kind of set up needs a dedicated administrator for monitoring and support; the queue manager will not be available during the failure being detected and until the services are restored on the passive node; the messages on the failed queue manager are stranded until the queue manager is restarted; single point of failure; the client will have to handle the outage during the failover which might take from a few seconds to minutes; the application will not be available until the failover process is complete; there are licensing and maintenance costs associated with software; no control on failover mechanism; performance overhead with complicated cluster configuration; achieving a repeatable configuration process takes a lot of time, resources, and documentation overhead.

Hence a need exists for an improved system for ensuring high availability for an enterprise application.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
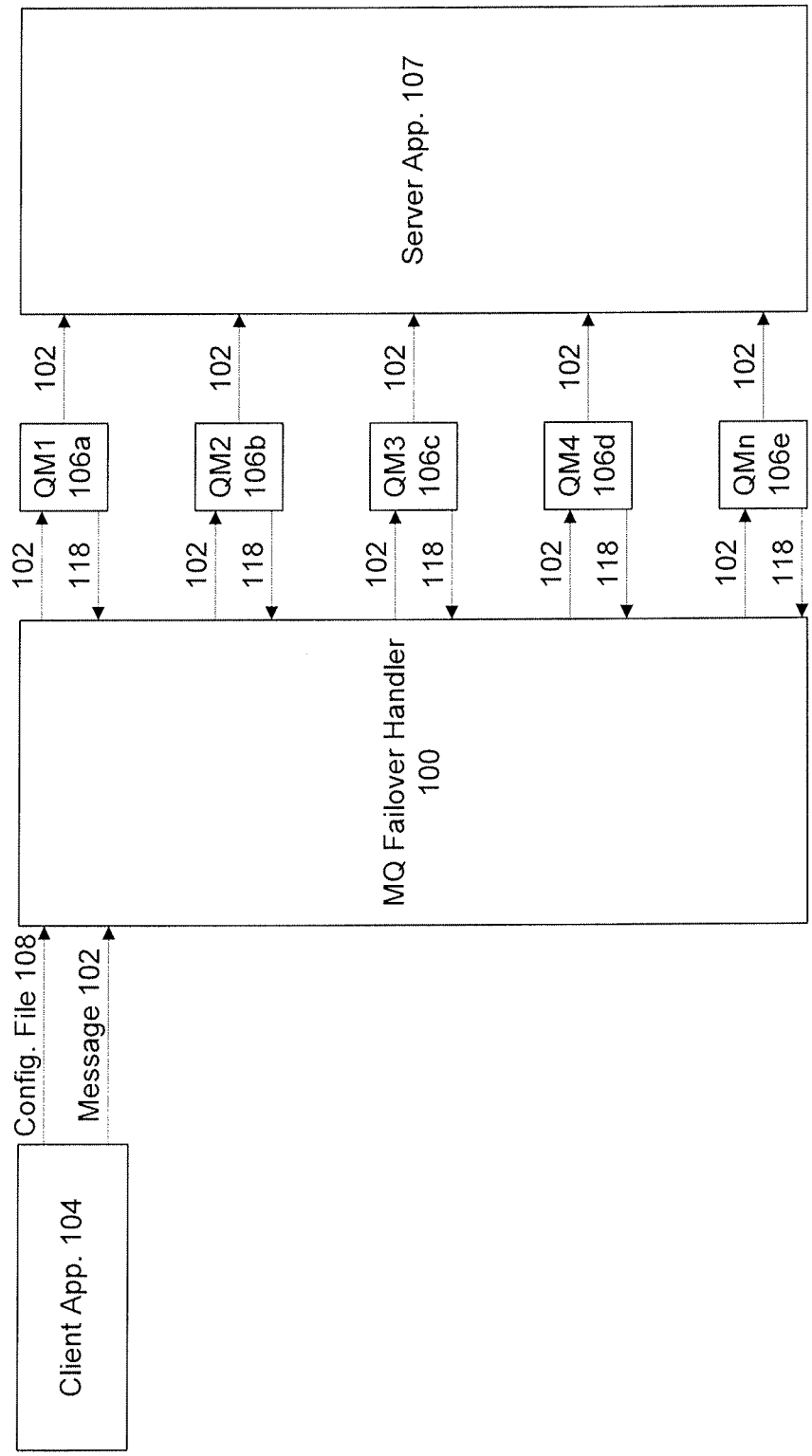
FIG. 1 illustrates a system for implementing a method for transmitting a message from a client application to a server application using a failover handler to distribute messages through queue managers.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Generally, a message queue (MQ) failover handler 100 receives a message 102 and a configuration file 108 from a client application 104. Each client application 104 provides a unique configuration file 108. The configuration file 108 is generally loaded only once. However, updates to the configuration file 108 may result in a subsequent loading of the configuration file 108. It may not be necessary, in some embodiments, to load the configuration file 108 with each message. The configuration file 108 provides an indication of which of a number of queue managers (QMs) 106 should be the first choice for receipt and delivery of the message 102 to a server application 107. The configuration file 108 also provides an indication of which of the QMs 106 should be a second choice for receipt and delivery of the message to the server application 107. Thus, in the event the first choice of the QMs 106 is unavailable, the second choice of the QMs 106 can immediately be utilized. Such configuration may involve a third choice, fourth choice, etc., and, after all choices indicated in the configuration file 108 have been attempted, the first choice of the QMs 106 is attempted again. The configuration file 108 also includes information such as number of retry attempts, time interval, and whether to loop back to the first choice of the QMs.

Such features may offer improvements over the active-passive solution, the active-active solution, and the combination solution. In particular, the present disclosure may provide a solution that is inexpensive and simple for achieving high availability. The shared disk used in the active-passive solution and the combination solution may be omitted. Likewise, idle nodes of the active-passive solution may be used. Further, when failure does occur, messages sent using the apparatus, systems, and methods of the present disclosure, may be delivered without the delay associated with the active-passive solution, the active-active solution, and the combination solution. In particular, as opposed to the active-passive solution, the active-active solution, and the combination solution, the first failed message of the present disclosure may be delivered before the failover process is complete. In other words, when a message fails to be delivered through a particular QM, the message may still be delivered before that QM is back online.

Reference now is made in detail to the examples illustrated in the accompanying drawings and discussed below. FIG. 1 illustrates a system for transmitting the message 102 from the client application 104 to the server application 107. The MQ failover handler 100 receives the message 102 from the client application 104, determines which one of the QMs 106 (illustrated as 106a through 106e) should receive the message 102. The MQ failover handler 100 identifies in order the QMs 106 intended for client application communication with a server application 107. Such identification is based on the configuration file 108 provided by the client application 104 to the MQ failover handler 100.

The MQ failover handler 100 obtains the configuration file 108 from the client application 104 prior to receiving the message (e.g., a one-time loading at a start-up of the client application 104, or subsequent loading after modification of the configuration file 108) or otherwise determines an ordering for the QMs 106 intended for communication of the message 102 from the client application 104 to the server application 107. For example, the ordering illustrated indicates the following: 106a, 106b, 106c, 106d, and 106e. The client application 104 transmits the message 102 to the MQ failover handler 100, which transmits the message 102 to the first QM (e.g., 106a) indicated in the configuration file 108. The QMs are system programs that provide queuing services to applications. The QMs provide application programming interfaces so programs can put messages on, and get messages from queues. QMs may also provide additional functions allowing administrators to create new queues, alter properties of existing queues, and control operations of the QMs.

After transmitting the message 102 to the first QM, the MQ failover handler 100 then determines whether the transmission was successful or not. In an example, a determination of unavailability of the first QM involves an attempt to send the message 102 from the client application 104 to the first QM (e.g., 106a) for delivery, and a determination that the attempt to send the message 102 from the client application 104 to the first QM failed. In the illustrated example, each QM 106 provides a success/failure indication 118 to the MQ failover handler 100. Such indication 118 indicates successful transmission or indicates failure in the form of an exception, a failure message, or a timeout message. Alternatively, MQ failover handler 100 determines that the first QM is unavailable after a lack of communication from the first QM for a set period of time, which is optionally indicated in the configuration file 108. Upon successful receipt of the message 102 from the MQ failover handler 100, the QM 106 communicates the message 102 to the server application 107. However, if the transmission is unsuccessful, the MQ failover handler 100 provides an alternative route.

Once the MQ failover handler 100 determines that the first QM 106a for the client application 104 is unavailable, the MQ failover handler 100 identifies the second QM 106b in the order of QMs 106 indicated in the order of the configuration file 108 provided by the client application 104. The MQ failover handler 100 then attempts to send the message 102 to the second QM for delivery to the server application 107. The MQ failover handler 100 then determines whether the transmission was successful or not in a manner similar to that described for the first QM 106a. Upon successful receipt of the message 102 from the MQ failover handler 100, the QM 106b communicates the message 102 to the server application 107. However, if the transmission is unsuccessful, the MQ failover handler 100 provides yet another alternative route.

Once the MQ failover handler 100 determines that the second QM 106b for the client application 104 is unavailable, the MQ failover handler 100 identifies the third QM (e.g., 106c) in the order of QMs 106 indicated in the order of the configuration file 108 provided by the client application 104. The MQ failover handler 100 then attempts to send the message 102 to the third QM 106c for delivery to the server application 107. The MQ failover handler 100 then determines whether the transmission was successful or not in a manner similar to that described for the first and second QMs. The process continues in a similar manner until the message 102 is successfully transmitted, or the last or final QM (e.g., 106e) is determined to be unavailable, at which point the process is repeated, starting again at the first QM.

Figure 2:
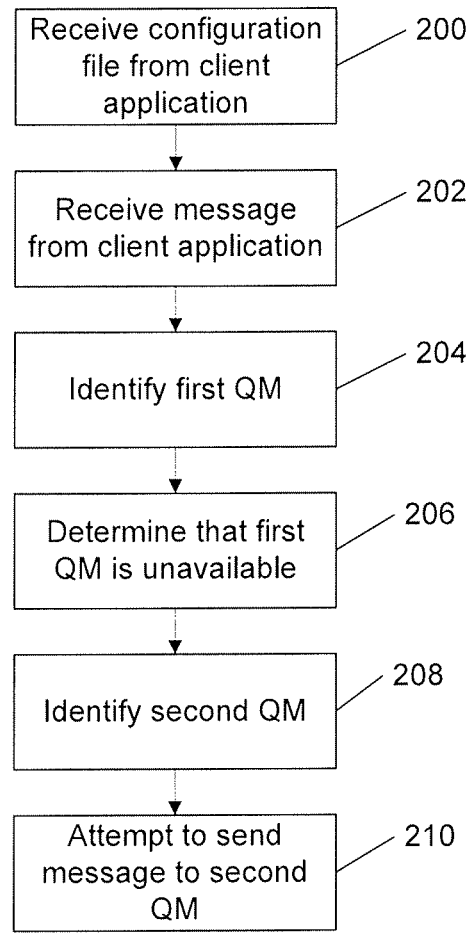
FIG. 2 illustrates a method for transmitting a message from a client application to a server application.

Referring now to FIG. 2, an exemplary method involving the MQ failover handler 100 involves receiving the message 102, identifying the order of QMs for communication of the message 102 from the client application 104 to the server application 107, determining that the first QM (e.g., 106a) is unavailable, and attempting to send the message to the second QM (e.g., 106b). More particularly, at step 200, the MQ failover handler 100 receives the configuration file 108 from the client application 104. The configuration file 108 indicates in order the QMs intended for the client application 104 communication with the server application 107. At step 202, the MQ failover handler 100 receives the message 102 for the server application 107 from the client application 104. At step 204, the MQ failover handler 100 identifies in the order the first QM 106a for communication of the message 102 from the client application 104 to the server application 107. At step 206, the MQ failover handler 100 determines that the first QM 106a is unavailable. At step 208, in response to the unavailability of the first QM 106a, the MQ failover handler 100 identifies in the order the second QM 106b for communication of the message 102 from the client application 104 to the server application 107 based on the configuration file 108 provided by the client application 104. At step 210, the MQ failover handler 100 attempts to send the message 102 from the client application 104 to the second QM 106b for delivery to the server application 107.

Figure 3:
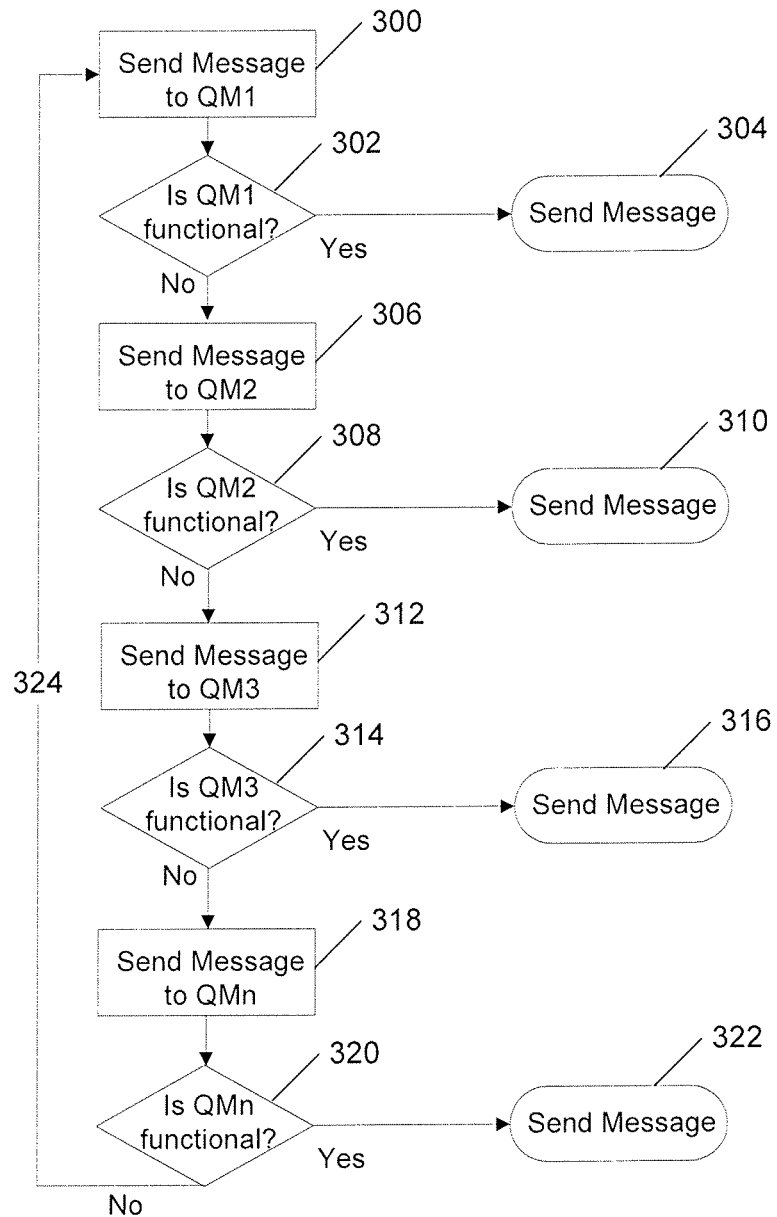
FIG. 3 illustrates an algorithm for a MQ failover handler for use in the system of FIG. 1.

Referring now to FIG. 3, an exemplary algorithm of MQ failover handler 100 is configured to function as illustrated. This algorithm detects a failure of a given QM and moves on to the next QM. The algorithm is client-based and configuration driven. The names, connectivity settings, and order of any number of QMs are configured in the configuration file 108. At step 300, the MQ failover handler 100 sends the message 102 to the first QM indicated in the configuration file 108 received from the client application 104 as shown in FIG. 1. If the client fails to connect to the primary QM, the MQ failover handler 100 tries to connect to the next QM, and so on until the MQ failover handler 100 reaches the end of the configuration file 108 or until one of the QMs is available to process the transaction. Hence, at step 302, the MQ failover handler 100 determines whether the first QM (QM1) is functional. If the first QM (QM1) is determined to be functional, the MQ failover handler 100 sends the message 102 to the first QM (QM1) at step 304. If the first QM (QM1) is not determined to be functional, the MQ failover handler 100, at step 306, sends the message 102 to the second QM (QM2) indicated in the configuration file 108. At step 308, the MQ failover handler 100 determines whether the second QM (QM2) is functional. If the second QM (QM2) is determined to be functional, the MQ failover handler 100 sends the message 102 to the second QM (QM2) at step 310. If the second QM (QM2) is not determined to be functional, the MQ failover handler 100, at step 312, sends the message 102 to the third QM (QM3) indicated in the configuration file 108. At step 314, the MQ failover handler 100 determines whether the third QM (QM3) is functional. If the third QM (QM3) is determined to be functional, the MQ failover handler 100 sends the message 102 to the third QM (QM3) at step 316. If the third QM (QM3) is not determined to be functional, the MQ failover handler 100, at step 318, sends the message 102 to the next QM (QMn) indicated in the configuration file 108. At step 320, the MQ failover handler 100 determines whether the next QM (QMn) is functional. If the next QM (QMn) is determined to be functional, the MQ failover handler 100 sends the message 102 to the next QM (QMn) at step 322. If the next QM (QMn) is not determined to be functional, the MQ failover handler 100, at step 324, repeats the process, starting with sending the message 102 to the first QM (QM1).

The configuration file 108 provides different orders for the choices of QMs 106, depending on a number of factors, including but not limited to, balancing of loading and scheduled maintenance. A web based configuration tool (not shown) allows for a user to manipulate the indication of the QMs in the configuration file 108 for the client application 104. Such a web based configuration tool may be used to view the configuration file 108 and refresh when the configuration file 108 changes. In addition, the web based configuration tool can be used for full administration, adding new QMs, removing QMs, and/or modifying the order of the choices of QMs.

Different client applications sending different messages may have different ordering for the preferred QMs. Thus, the order of the QMs 106 is able to vary from one client application or group of applications to another and can be modified without active intervention on the part of the client.

Figure 4:
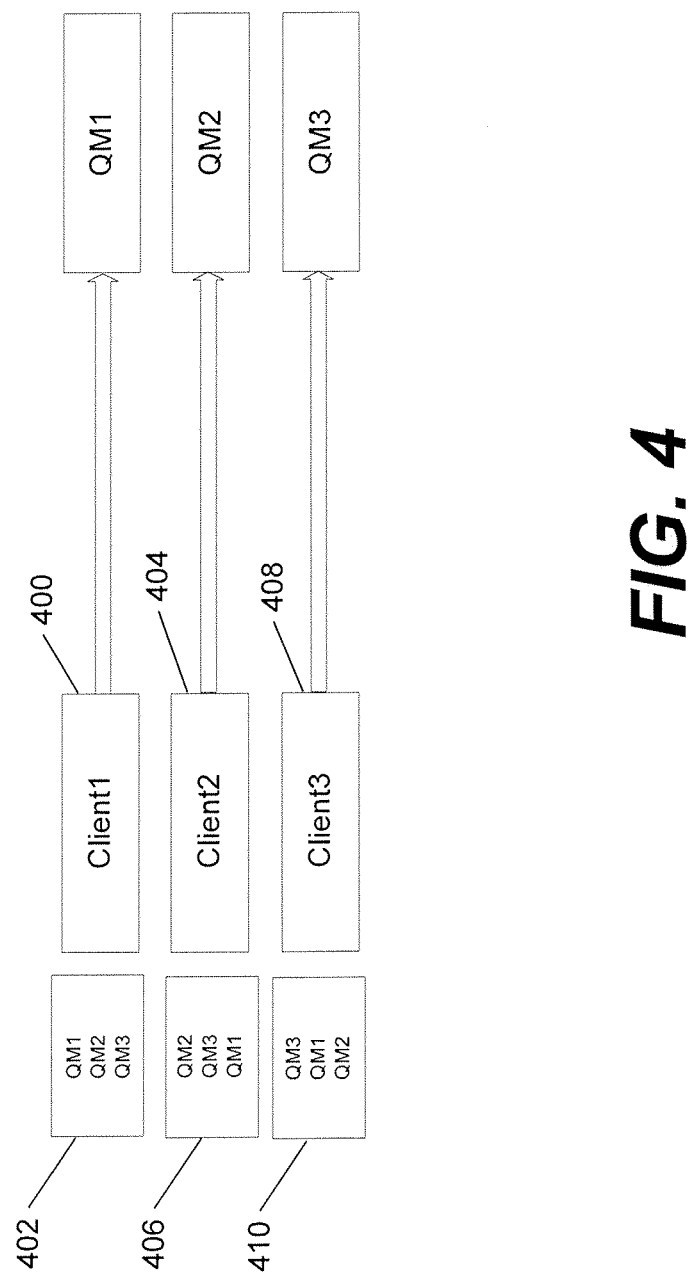
FIG. 4 illustrates various connections between a client application and queue managers (QMs), with three QMs functioning normally.
Figure 5:
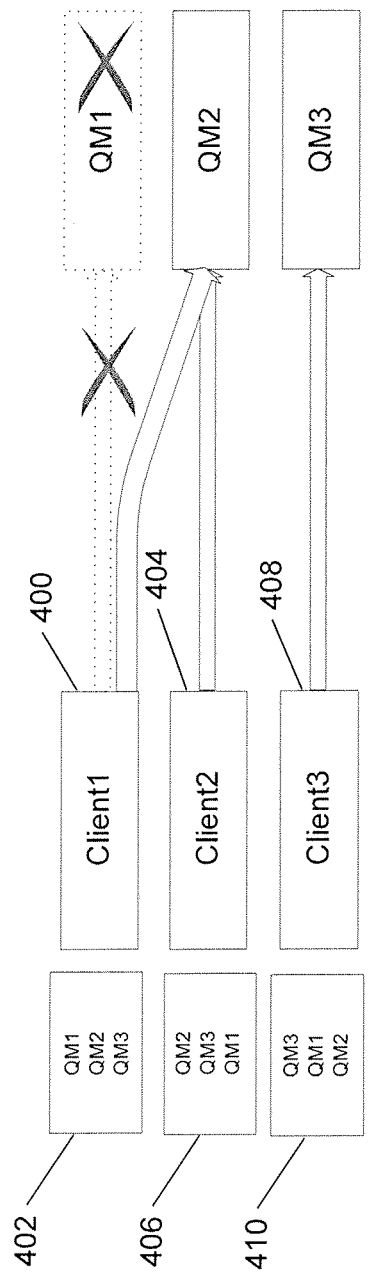
FIG. 5 illustrates various connections between the client application and QMs of FIG. 4, with one of the QMs not functioning.
Figure 6:
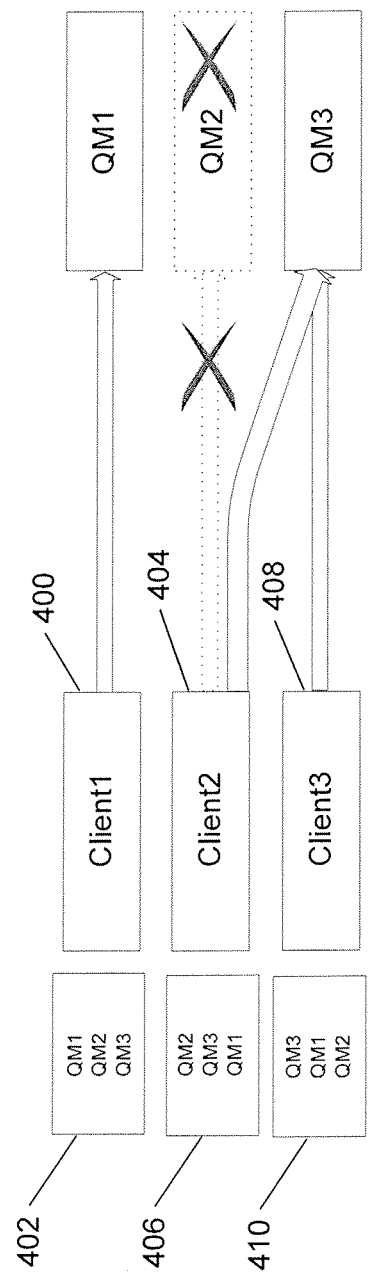
FIG. 6 illustrates various connections between the client application and QMs of FIG. 4, with a different one of the QMs not functioning.

Referring now to FIGS. 4-6, various QM configurations are used for different client applications. In the illustrated example, a first client application 400 has an associated configuration file 402 with a preferred QM ordering of QM1, QM2, QM3, while a second client application 404 has an associated configuration file 406 with a preferred QM ordering of QM2, QM3, QM1, and a third client application 408 has an associated configuration file 410 with a preferred QM ordering of QM3, QM1, QM2. As illustrated in FIG. 4, in a normal operating state without failures, the first client application 400 connects to QM1 in accordance with the identification thereof as the first QM of the configuration file 402, the second client application 404 connects to QM2 in accordance with the identification thereof as the first QM of the configuration file 406, and the third client application 408 connects to QM3 in accordance with the identification thereof as the first QM of the configuration file 410. Referring to FIG. 5, if QM1 becomes unavailable, the MQ failover handler 100 will detect unavailability and deliver associated messages of the first client application 400 to the second QM of the configuration file 402, or QM2 in the example. However, there is no change to the message delivery of the second client 404 and the third client 408. Referring to FIG. 6, if QM1 remains operational, but QM2 becomes unavailable, the MQ failover handler 100 will detect unavailability and deliver associated messages of the second client application 404 to the second QM of the configuration file 406, or QM3 in the example. However, there is no change to the message delivery of the first client 400 and the third client 408. Any of a number of configurations can be used for the management of message delivery various client applications or groups of applications through the MQ failover handler 100.

Such a high availability capable client solution can be applied to any enterprise application that needs to be Highly Available. This solution can be implemented using J2EE/JMS API, Native MQ Interface or any other programming language. This solution is highly suited for the applications which interact with various software components in order to serve the request. This exemplary solution is implemented as a reusable utility using J2EE/JMS API and named as MQ Failover Handler.

Figure 7:
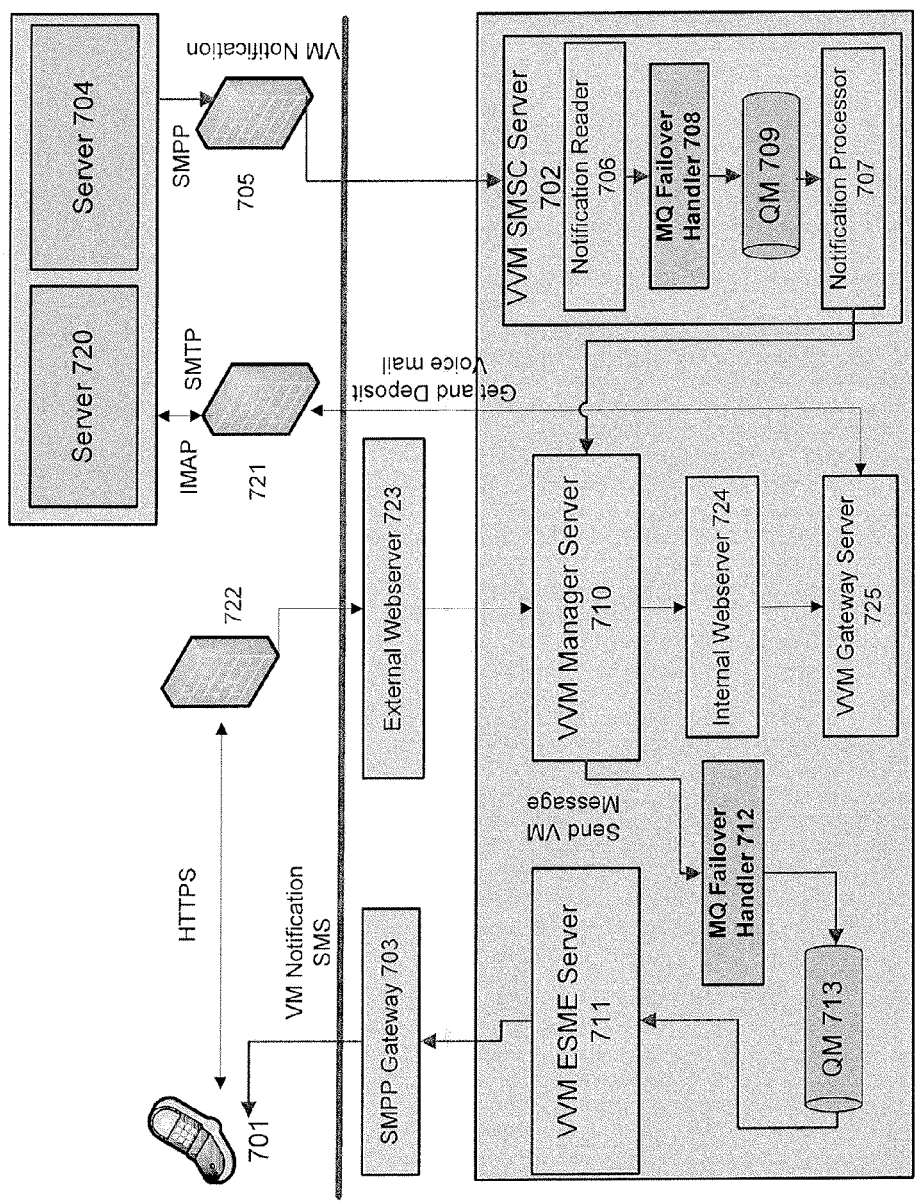
FIG. 7 illustrates a visual voice mail architecture and MQ failover handler.

FIG. 7 illustrates an exemplary visual voice mail (VVM) architecture and MQ failover handler. VVM is an application associated with network-provided voice mail service, which allows a user to view caller and voice mail information and listen to voice mail messages in any order on their wireless device. For example, the user can browse through his/her messages, pick the ones to listen to and/or erase or archive messages from the display on the mobile station 701. The user can also call back, text and add to contacts directly from the VVM screen. Part of the VVM service relies on a text message notification sent to the mobile station 701 in response to each new voice mail stored in the voice mail system(s). The text messaging aspect of VVM is used here as an example of an application of the MQ failover handler.

A short message service center (SMSC) is a system within the wireless network that sends short message service (SMS) messages to mobile stations and receives SMS messages from mobile stations. For convenience, the SMSC is omitted from FIG. 7.

The VVM SMSC server 702 communicates with external customer equipment, typically computers hosting external short message entity (ESME) applications, via an internet protocol (IP) network. To provide the interface for such communications to the wireless network, the network or system includes a simple messaging service point-to-point (SMPP) gateway 703. The SMPP gateway 703 communicates with the SMSC in the wireless network via an internal IP link or network (not separately shown), and the gateway communicates with the packet data network (and/or the public Internet). The SMPP gateway 703 allows the VVM SMSC server 702 to receive and send messages in IP packet format for communications via the SMSC and the wireless network that appear as SMS messages over the air going to and from the mobile stations. The SMPP gateway 703 is the entity at the edge of the wireless mobile communication network that acts as an intermediary between the wireless service provider network and the external application server community. For example, the gateway server converts messages in protocol(s) used by the ESME applications on the external servers, e.g. Extensible Markup Language (XML), Hypertext Mail Protocol (HTMP), etc., to and from the SMPP protocol used for SMS services through the wireless network. The SMPP messages ride on IP transport, e.g. between the gateway and the SMSC.

For VVM service, the voice mail system that receives and stores a message for a particular user's mobile station sends message addressed to the mobile station 701 and to the VVM application within the mobile station 701. The message is delivered to the mobile station as an SMS type message in our example. The message includes the relevant information about the message to support the visual aspects of the VVM feature or service.

To implement this message delivery, once a voicemail has been deposited, a voice mail platform server 704 sends a voicemail notification via SMPP through firewall 705 to VVM SMSC server 702. The VVM SMSC server 702 puts the message in a QM 709 using MQ failover handler 708. The VVM SMSC server 702 includes a logical interface, in the form of notification reader 706, to facilitate the VVM notification communications. To the 'client' application of the voice mail system(s), this interface appears as a server, and this interface will act as a broker between the voice mail systems and the notification middleware, particularly the notification processor 707. For example, the notification reader 706 may parse each notification message from one of the voice mail systems to form a XML message appropriate for delivery to the notification processor 707. MQ failover handler 708 and QM 709, as in the earlier part of the detailed description, deliver each notification to a/the notification processor 707. The notification processor 707, which is part of VVM SMSC server 702, reads off the QM 709 and sends the message to a VVM manager server 710.

The VVM manager server 710 performs a lookup in its database to identify the user's subscription status. If the user is a VVM subscriber, the VVM manager server 710 generates a notification message and puts the notification message in a QM 713 via MQ failover handler 712.

The VVM manager server 710 then sends the voicemail identification via MQ failover handler 712 and QM 713, as in the earlier part of the description, to the VVM ESME server 711. The ESME server 711 reads notification messages from QM 713 and submits the notification messages to SMPP gateway 703. The ESME server 711 is configured to implement an application service that utilizes SMS type message transport through the wireless mobile communication network. Typically, the ESME server 711 is a third party customer system outside the carrier's network(s), e.g. a system of a value added service provider (VASP), although for VVM, the ESME server 711 may be operated by the carrier.

Rather than communicate directly with the other elements of the carrier's wireless network, the ESME server 711 usually sends and receives messages over an IP network or link and through a SMPP gateway connected to the IP packet portion of the carrier's wireless network. Thus, the VVM ESME server 711 sends the voicemail notification to SMPP gateway 703. The voicemail notification is sent via SMS from the SMPP gateway 703 to a SMSC (not shown) in the mobile network for SMS delivery to the mobile station 701. The various applications for the VVM notification processing, from the VVM SMSC server 702 through to the VVM ESME server 711, comprise application programming software, which may run on the one or more computers.

The MQ failover handlers 708, 712 are distributed as reusable libraries and may include separate handlers if more efficiency and/or handling of a particular traffic load is warranted or desired. In order to benefit from this solution, the client implements interfaces (e.g., in the form of a few lines of extra coding) to point to the appropriate configuration file by providing a file with all available QM configurations and invokes a send message function on the appropriate MQ failover handler. When there is a problem with any of the QMs, the MQ failover handler connects to the next available QM transparently. Transparent failover features of this utility make the client applications highly available. MQ Java Naming and Directory Interface (JNDI) names are configured in a mq_config.properties file. The MQ failover handler reads the QM configuration from the mq_config.properties file and loads the primary and secondary QM JNDI names into cache in the same order defined in the configuration file. Each client application (or a group of client applications) maintains its own copy of the QM configuration file defined based on load and available QMs. The client application merely provides the configuration file name on start up. When the client application starts sending the messages, the client application simply hands the message over to the MQ failover handler. In the example of FIG. 7, the client application for the MQ failover handler 708 and QM 709 is the notification reader 706, whereas the client application for the MQ failover handler 712 and QM 713 is the VVM manager server 710. This respective MQ failover handler tries to send the message to the primary QM, and if the primary QM is not available, the MQ failover handler sends the message to the secondary QM listed in the configuration file. Failover operation inside the MQ failover handler is transparent to the client. Changing the configuration file is simple and can be reloaded as desired at any time.

On receipt of a new VM notification SMS message, the mobile station 701 wakes a VVM client and alerts the user with a pop up indicating the existence of new voicemail. When the user opens the VVM client on the mobile station 701, the mobile station 701 sends a secure hypertext transfer protocol (HTTP) request to the VVM manager server 710 via a firewall 722. The VVM manager server 710 retrieves the voice mail via the server 720 and sends it to the VVM client on mobile station 701, where the user can play the new voicemail.

As outlined above the client application and the server application run as programming on one or more computer platforms. The MQ failover handler as well as the queue manager and message queues also are implemented as programming on one or more computer platforms.

As known in the data processing and communications arts, a general-purpose computer typically comprises a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data. The software code is executable by the general-purpose computer that functions as the backend or frontend application server or the platform for the middleware service system. In operation, the code is stored within the general-purpose computer platform. At other times, however, the software is stored at other locations and/or transported for loading into the appropriate general-purpose computer system.

Figure 8:
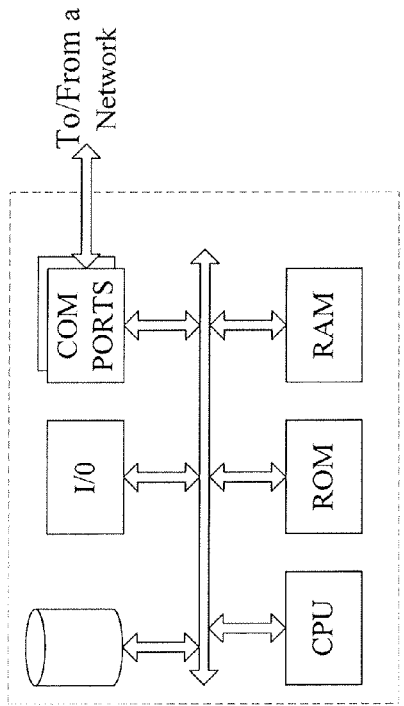
FIG. 8 is a simplified functional block diagram of a computer that may be utilized in the systems described herein.
Figure 9:
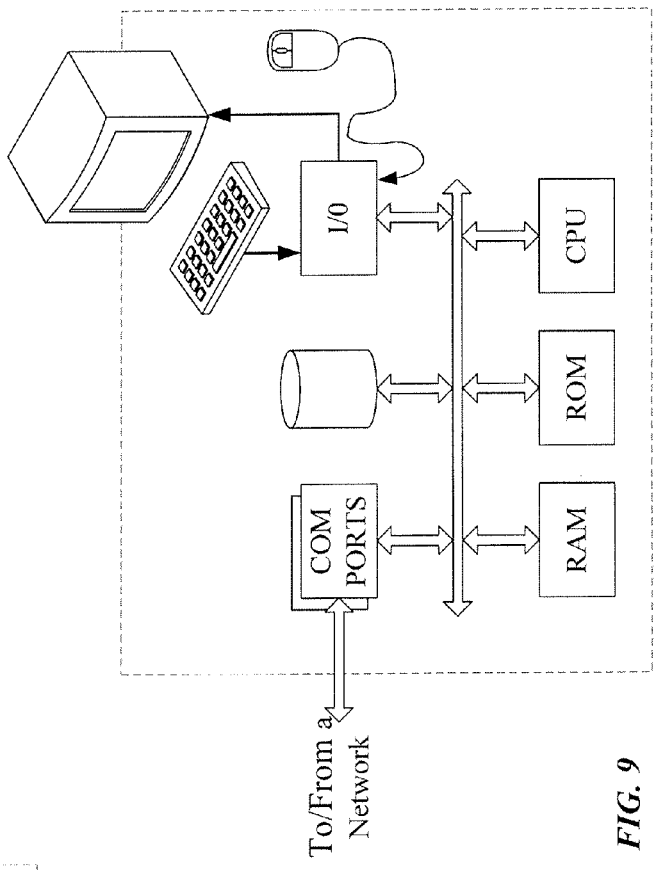
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as is typically used to implement a server. FIG. 9 depicts a computer with user interface elements, as used to implement a personal computer or other type of work station or terminal device, although the computer of FIG. 9 can also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions can be implemented in a distributed fashion on a number of similar platforms, to distribute the processing load.

Hence, aspects of the failover technologies outlined above can be embodied in programming. Program aspects of the technology can be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which provide non-transitory storage at any time for the software programming. All or portions of the software can at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium can take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the methods of aggregating message traffic requiring backend processing in a manner that insures a response required for synchronous processing by a requesting frontend application shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media can be involved in carrying one or more sequences of one or more instructions to a processor for execution.

This highly available capable client solutions described herein may give the ability to reuse the developed components in other areas to address similar availability and failover issues. This solution is simple and elegant although it does not provide all the features supported by vendor based failover software such as managing resources, stopping or starting the services, etc. The configuration is pretty straight forward, at a minimum it may only require a specification of the order of QMs, with code that is simple and easy to support and enhance.

Thus, the aforementioned description may provide a high availability capable client solution that is inexpensive and simple to achieve high availability. This solution may allow clients to connect themselves to alternative services while the failed service is being restored. This solution is simple to configure and may be less prone to errors than prior attempts. Implementation of this solution may not require a specialized administrator or additional administrative costs. This solution may detect failure quickly and redirect calls to the service on other nodes. A web based configuration tool may give flexibility in debugging and tuning with various different server configurations. It may be easy to achieve workload balance between the available QMs. As this solution is implemented as a reusable framework, it may also add value to time to market for future projects.

Other potential advantages of the subject technology may include one or more of the following: simple to configure and scale, and it does not require specialized administrator; due to the simplicity, the configuration is prone to fewer errors, hence application will be highly available; no extra administration costs as the configuration is part of application; configuration corrections are web based and server restart is not required which gives flexibility in debugging and tuning with various different QM configurations; quick and transparent failover-client will not have to worry about backend system status; single point of failure is completely eliminated without additional expenses on software and hardware; easy to achieve workload balance between the available QMs; application will be always available even before and after the QM failure is detected; there is no hassle to obtain licensing and no maintenance costs associated; complete control on failover mechanism; increased performance as the failover process is dynamic and transparent to the client application; and faster development and delivery of future middleware projects with reusable component.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

CD-ROM—Compact Disk Read Only Memory
CPU—Central Processing Unit
DVD—Digital Video Disk
DVD-ROM—Digital Video Disk Read Only Memory
EAI—Enterprise Application Integration
EEPROM—Electrically Erasable Programmable Read Only Memory
ESME—External Short Message Entity
FLASH-EPROM—Flash Erasable Programmable Read Only Memory
HTTP—Hypertext Transfer Protocol
IP—Internet Protocol
IR—Infrared
JNDI—Java Naming and Directory Interface
MOM—Message Oriented Middleware
MQ—Message Queue
MQ JNDI—Message Queue Java Naming and Directory Interface
PROM—Programmable Read Only Memory
QM—Queue Manager
RAM—Random Access Memory
RF—Radio Frequency
ROM—Read Only Memory
SMPP—Simple Messaging Service Point-To-Point
SMS—Short Message Service
SMSC—Short Message Service Center
VASP—Value Added Service Provider
VVM—Visual Voice Mail

What is claimed is:

1. A system comprising:
a first plurality of queue managers (QMs) intended for communication of a first voicemail notification related to
a status of a voicemail stored in a voicemail system;
a first message queue failover handler configured to:
   determine an ordering for the first plurality of QMs;
   transmit, to a first QM of the first plurality of QMs as determined by the ordering of the first plurality of QMs, the first voicemail notification;
   after transmitting the first voicemail notification to the first QM of the first plurality of QMs, determine that the first QM of the first plurality of QMs is unavailable; and
   responsive to determining the unavailability of the first QM of the first plurality of QMs, transmit, to a second QM of the first plurality of QMs, the first voicemail notification;
a second plurality of QMs intended for communication of a second voicemail notification related to the status of the voicemail for delivery to a mobile device;
a second message queue failover handler configured to:
   determine an ordering for the second plurality of QMs;

transmit, to a first QM of the second plurality of QMs as determined by the ordering of the second plurality of QMs, the second voicemail notification;

after transmitting the second voicemail notification to the first QM of the second plurality of QMs, determine that the first QM of the second plurality of QMs is unavailable; and responsive to determining the unavailability of the first QM of the second plurality of QMs, transmit, to a second QM of the second plurality of QMs, the second voicemail notification; and a visual voicemail (VVM) manager server configured to generate the second voicemail notification based on receipt of the first voicemail notification.

2. The system of claim 1, wherein the first message queue failover handler is further configured to:

determine that the second QM of the first plurality of QMs is unavailable; and responsive to determining the unavailability of the second QM of the first plurality of QMs, transmit, to one or more additional QMs of the first plurality of QMs, the first voicemail notification.

3. The system of claim 1, wherein the first message queue failover handler is further configured to:

determine that a last QM of the first plurality of QMs, as determined by the ordering of the first plurality of QMs, is unavailable; and responsive to determining the unavailability of the last QM of the first plurality of QMs, transmit, to a previously attempted QM of the first plurality of QMs, the first voicemail notification.

4. The system of claim 1, wherein the second message queue failover handler is further configured to:

determine that the second QM of the second plurality of QMs is unavailable; and responsive to determining the unavailability of the second QM of the second plurality of QMs, transmit, to one or more additional QMs of the second plurality of QMs, the second voicemail notification.

5. The system of claim 1, wherein the second message queue failover handler is further configured to:

determine that a last QM of the second plurality of QMs, as determined by the ordering of the second plurality of QMs, is unavailable; and responsive to determining the unavailability of the last QM of the second plurality of QMs, transmit, to a previously attempted QM of the second plurality of QMs, the second voicemail notification.

6. The system of claim 1, wherein:

the first message queue failover handler is further configured to receive, prior to receiving the first voicemail notification, a first configuration file comprising the ordering for the first plurality of QMs; and the second message queue failover handler is further configured to receive, prior to receiving the second voicemail notification, a second configuration file comprising the ordering for the second plurality of QMs.

7. The system of claim 1, wherein:

the first voicemail notification is intended for delivery by the first plurality of QMs to a notification processor of a VVM short message service center (SMSC) server;

the first message queue failover handler is further configured to receive the first voicemail notification from a notification reader of the VVM SMSC server;

the VVM manager server is further configured to receive the first voicemail notification from the notification processor of the VVM SMSC;

the second message queue failover handler is further configured to receive the second voicemail notification from the VVM manager server; and the second voicemail notification is intended for delivery by the first plurality of QMs to a VVM external short message entity (ESME) server.

8. The system of claim 7, wherein the VVM manager server is further configured to generate the second voicemail notification based upon a determination that a user of the mobile device is a VVM subscriber.

9. A system comprising:

a processor;

a memory; and a message queue failover handler program in the memory, wherein execution of the message queue failover handler program by the processor configures the system to implement functions, including functions to:

receive a message for a server application from a client application;

based on a configuration file provided by the client application indicating in order a number of queue managers (QMs) intended for client application communication with the server application, identify in the order a first of the QMs for communication of the message from the client application to the server application;

attempt to send the message from the client application to the first of the QMs for delivery to the server application;

after transmitting the message to the first of the QMs, determine that the first of the QMs is unavailable;

identify in the order a second of the QMs for communication of the message from the client application to the server application based on the configuration file provided by the client application; and responsive to determination of the unavailability of the first of the QMs, attempt to send the message from the client application to the second of the QMs for delivery to the server application.

10. The system of claim 9, wherein further execution of the message queue failover handler program by the processor further configures the system to further implement functions, including functions to:

determine that the attempt to send the message from the client application to the second of the QMs failed;

identify in the order one or more additional QMs for communication of the message from the client application to the server application based on the configuration file provided by the client application; and responsive to determination that the attempt to send the message from the client application to the second of the QMs failed, attempt to send the message from the client application to the additional QMs, in turn, until the message is delivered to the server application.

11. The system of claim 9, wherein further execution of the message queue failover handler program by the processor further configures the system to further implement functions, including functions to:

determine that an attempt to send the message from the client application to a last in the order of the QMs failed; and attempt to send the message from the client application to a previously attempted QM for delivery.

12. The system of claim 9, wherein the implemented function to determine that the first of the QMs is unavailable is based on a lack of communication from the first of the QMs for a set period of time after transmission of the message to the first of the QMs.

13. The system of claim 9, wherein further execution of the message queue failover handler program by the processor further configures the system to further implement functions, including a function to:
receive, prior to receiving the message, a configuration file comprising the ordering for the QMs.

14. The system of claim 9, wherein further execution of the message queue failover handler program by the processor further configures the system to further implement functions, including a function to:
receive, after receipt of a configuration file comprising the ordering for the QMs, a modified configuration file comprising a modified ordering for the QMs.

15. A system comprising:
a processor;
a memory; and
a message queue failover handler program in the memory, wherein execution of the message queue failover handler program by the processor configures the system to implement functions, including functions to:
determine an ordering for a number of queue managers (QMs) intended for communication of a message from a client application to a server application;
receive, from the client application, the message for the server application;
transmit, to a first QM selected based on the determined ordering, the message for the server application;
after transmitting the message to the first QM, determine that the function to transmit the message to the first QM failed; and
responsive to the failure of the function to transmit the message to the first QM, transmit, to a second QM selected based on the determined ordering, the message for the server application.

16. The system of claim 15, wherein further execution of the message queue failover handler program by the processor further configures the system to further implement functions, including functions to:
determine that the function to transmit the message to the second QM failed; and
responsive to the failure of the function to transmit the message to the second QM, transmit, to one or more additional QMs selected based on the determined ordering, the message for the server application.

17. The system of claim 15, wherein further execution of the message queue failover handler program by the processor further configures the system to further implement functions, including functions to:
determine that the function to transmit the message to a last QM, as determined by the ordering, is unavailable; and
responsive to the failure of the function to transmit the message to the last QM, transmit, to a previously attempted QM, the message for the server application.

18. The system of claim 15, wherein the implemented function to determine that the function to transmit the message to the first QM failed further comprises functions, including functions to:
receive from the first QM a response to transmission of the message for the server application; and
determine, based on the received response, that the function to transmit the message to the first QM failed if the received response indicates one of:
an exception;
a failure; or
a timeout.

19. The system of claim 15, wherein further execution of the message queue failover handler program by the processor further configures the system to further implement functions, including a function to:
receive, prior to receiving the message, a configuration file comprising the ordering for the QMs.

20. The system of claim 15, wherein further execution of the message queue failover handler program by the processor further configures the system to further implement functions, including a function to:
receive, after receipt of a configuration file comprising the ordering for the QMs, a modified configuration file comprising a modified ordering for the QMs.

* * * * *